US012523734B2

(12) United States Patent
Ficara et al.

(10) Patent No.: US 12,523,734 B2
(45) Date of Patent: Jan. 13, 2026

(54) COOPERATING DELEGATED DEVICES FOR BACKSCATTERING COMMUNICATION AND ENERGY HARVESTING

(71) Applicant: Cisco Technology, Inc., San Jose, CA (US)

(72) Inventors: Domenico Ficara, Chemin de la sue (CH); Amine Choukir, Lausanne (CH); Pascal Thubert, Roquefort-les-Pins (FR); Leo Caldarola, Morrens (CH); Mathieu Monney, Bussigny (CH); Jerome Henry, Pittsboro, NC (US); Arun G. Khanna, Sunnyvale, CA (US)

(73) Assignee: Cisco Technology, Inc.

( * ) Notice: Subject to any disclaimer, the term of this patent is extended or adjusted under 35 U.S.C. 154(b) by 191 days.

(21) Appl. No.: 18/468,715

(22) Filed: Sep. 17, 2023

(65) Prior Publication Data

US 2024/0275205 A1    Aug. 15, 2024

Related U.S. Application Data

(60) Provisional application No. 63/484,542, filed on Feb. 13, 2023.

(51) Int. Cl.
*G01S 5/00* (2006.01)
*H02J 50/00* (2016.01)
*H02J 50/20* (2016.01)
*H02J 50/30* (2016.01)
*H04W 84/12* (2009.01)

(52) U.S. Cl.
CPC ............ *G01S 5/0027* (2013.01); *H02J 50/30* (2016.02); *H04W 84/12* (2013.01); *H02J 50/001* (2020.01); *H02J 50/20* (2016.02)

(58) Field of Classification Search
None
See application file for complete search history.

(56) References Cited

U.S. PATENT DOCUMENTS

2011/0080262 A1 * 4/2011 Richardson ........... G01S 5/0027
340/8.1
2021/0231792 A1   7/2021 Sundaresan et al.

FOREIGN PATENT DOCUMENTS

| WO | 2022199785 A2 | 9/2022 |
| WO | 2022200673 A1 | 9/2022 |
| WO | 2022222053 A1 | 10/2022 |
| WO | 2022170267 A1 | 11/2022 |

OTHER PUBLICATIONS

Talla, Vamsi "Power, Communication and Sensing Solutions for Energy Constrained Platforms", a dissertation, University of Washington, 2016, ResearchWorks Archive (219 pages).

* cited by examiner

*Primary Examiner* — Thomas S Mccormack
(74) *Attorney, Agent, or Firm* — Merchant & Gould P.C.

(57) ABSTRACT

A backscatter communication device assistant may be provided. A computing device may designate a client device as a backscatter communication device assistant. Next, a report indicating a location of a backscatter communication device may be received from the backscatter communication device assistant. Then the backscatter communication device may be caused to receive energy. Data originating from the backscatter communication device may then be received.

18 Claims, 5 Drawing Sheets

COOPERATING DELEGATED DEVICES FOR BACKSCATTERING COMMUNICATION AND ENERGY HARVESTING

RELATED APPLICATION

Under provisions of 35 U.S.C. § 119(e), Applicant claims the benefit of U.S. Provisional Application No. 63/484,542 filed Feb. 13, 2023, which is incorporated herein by reference.

TECHNICAL FIELD

The present disclosure relates generally to cooperating delegated devices for backscattering communication and energy harvesting.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
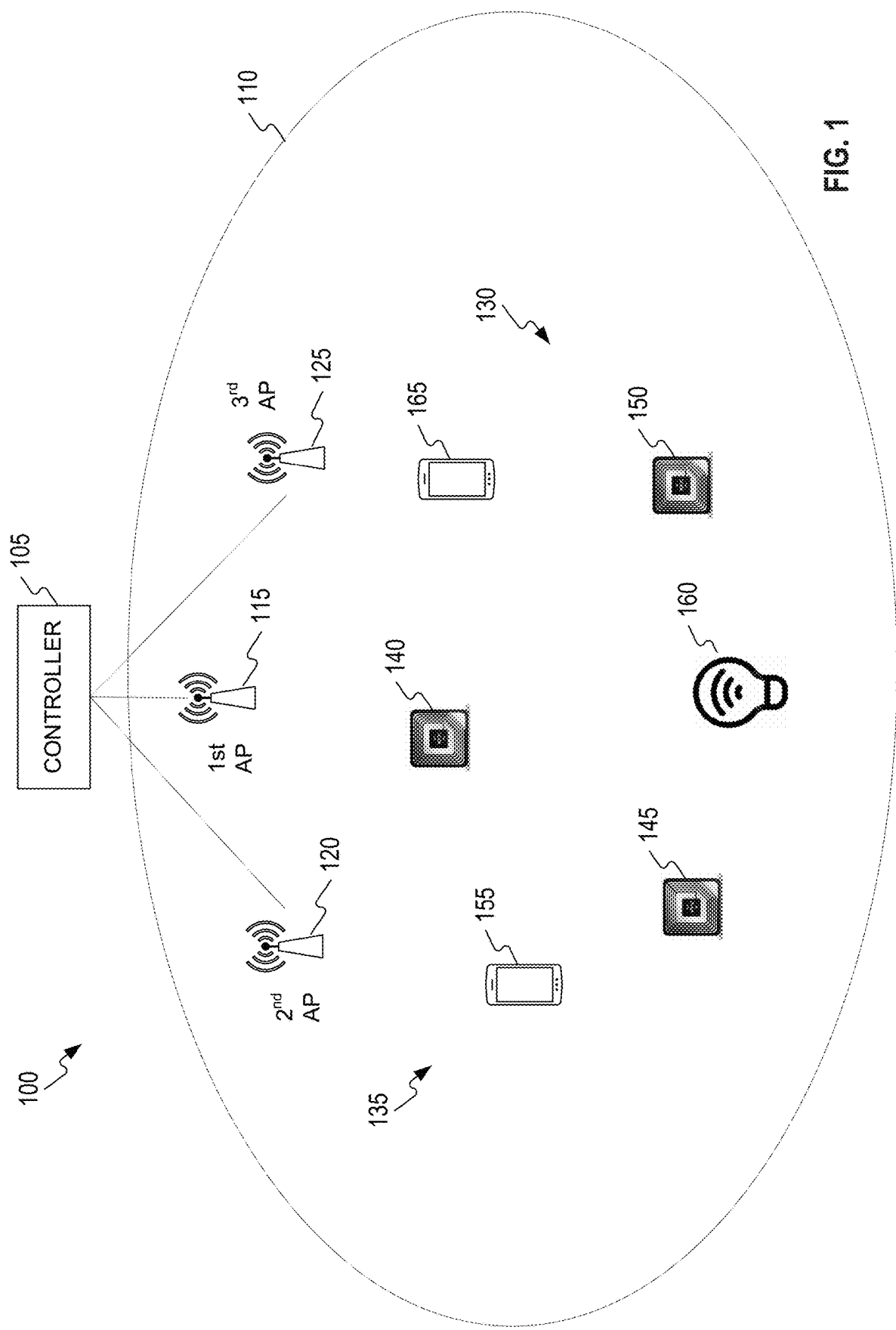
FIG. 1 is a block diagram of an operating environment for providing a backscatter communication device assistant.

A backscatter communication device assistant may be provided. A computing device may designate a client device as a backscatter communication device assistant. Next, a report indicating a location of a backscatter communication device may be received from the backscatter communication device assistant. Then the backscatter communication device may be caused to receive energy. Data originating from the backscatter communication device may then be received.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Backscatter Communication (i.e., BackCom) may use, light, ambient, or dedicated Radio Frequency (RF) energy to allow battery-less/very low-powered devices to communicate (e.g., at slow speed). For example, backscatter communication may be used for passive Radio Frequency Identification (RFID) tags. Internet-of-Things (IoT) sensors may be more and more ubiquitous, and they may be required to have battery power. This battery power requirement may increase maintenance costs. With backscatter communication, a sensor may be battery-less or use a very small battery that would last years and harvesting RF energy.

While backscatter communication may help solve the energy problem, it may also introduce new challenges related to the discovery of backscatter communication devices and the transmission of energy toward them to keep them powered. These challenges may include: i) wireless network infrastructure may have no knowledge about these devices and may not localize them (i.e., they may not be wireless client devices); ii) backscatter communication devices may depend on the wireless energy to be there when they need to communicate, which may not be a given (i.e., they may or may not have energy at any instant they are about to transmit); iii) backscatter communication devices may introduce some small noise to wireless network communication (i.e., in high density they may disrupt wireless client communications); and iv) delivering raw RF energy (e.g., to an RFID) may introduce noise to wireless networks.

Ambient RF energy may be harvested to power battery-less or battery-powered (extending lifespan) devices. The opportunistic nature may not allow for the reliable management of the devices or to guarantee a minimum level of power for the device operation. Ad-hoc management may be acceptable in small settings but may not scale. In addition, APs may not have full control of the whole power necessities for a certain deployment, for a few reasons. First, a backscatter communication device may not share its power and transmission schedules with the infrastructure because it may not have the ability. For example, in the case of no-battery light switches (e.g., those with some piezoelectric power-source, it may not be known when a person will decide to turn on or off the light). In addition, some backscatter communication devices may be in constant movement, hence tracking becomes complex. Furthermore, some backscatter communication devices may use a technology different than that supported by the infrastructure (e.g., a device may harvest light rather than RF). Accordingly, embodiments of the disclosure may provide a process to manage and power backscatter communication devices, while avoiding their interference with the regular wireless clients' operations.

FIG. 1 shows an operating environment 100 for providing a backscatter communication device assistant. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN) for devices. The plurality of APs may comprise a first AP 115, a second AP 120, and a third AP 125. Each of the plurality of APs may be compatible with specification standards such as, but not limited to, the Institute of Electrical and Electronics Engineers (IEEE) 802.11 specification standard for example.

A first plurality of devices 130 and a second plurality of devices 135 may be deployed in coverage environment 110. The plurality of APs may provide wireless network access to first plurality of devices 130 and second plurality of devices 135 as the plurality of client devices move within coverage environment 110. Coverage environment 110 may comprise an outdoor or indoor wireless environment for Wi-Fi or any type of wireless protocol or standard.

First plurality of devices 130 may comprise a first device 140, a second device 145, and a third device 150. First plurality of devices 130 may comprise backscatter communication devices, for example, RFID tags. First plurality of devices 130 may comprise, but are not limited to, general energy harvesting devices and pure backscatter communication devices. General energy harvesting devices may comprise devices that work in two phases: i) first harvesting RF energy for a time period; then ii) transmitting using this harvested RF energy. General energy harvesting devices may comprise battery-less Bluetooth Low Energy (BLE) chips for example. With a pure backscatter communication device, the RF signal that provides power may also be the one that is backscattered/modified according to some modulation hence encoding some symbols of information. In addition, first plurality of devices 130 may comprise devices that may receive or harvest energy from light energy and then use the energy from light to power transmission.

Second plurality of devices 135 may comprise a first client device 155, a second client device 160, and a third client device 165. Ones of second plurality of devices 135 may comprise, but are not limited to, a smart phone, a personal computer, a tablet device, a mobile device, a telephone, a remote control device, a set-top box, a digital video recorder, an Internet-of-Things (IoT) device, a network computer, a router, an AR/VR device an Automated Transfer Vehicle (ATV), a drone, an Unmanned Aerial Vehicle (UAV), a smart wireless light bulb, or other similar microcomputer-based device.

Controller 105 may comprise a Wireless Local Area Network controller (WLC) and may provision and control coverage environment 110 (e.g., a WLAN). Controller 105 may allow the plurality of client devices to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide a backscatter communication device assistant.

The elements described above of operating environment 100 (e.g., controller 105, first AP 115, second AP 120, third AP 125, first device 140, second device 145, third device 150, first client device 155, second client device 160, and third client device 165) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
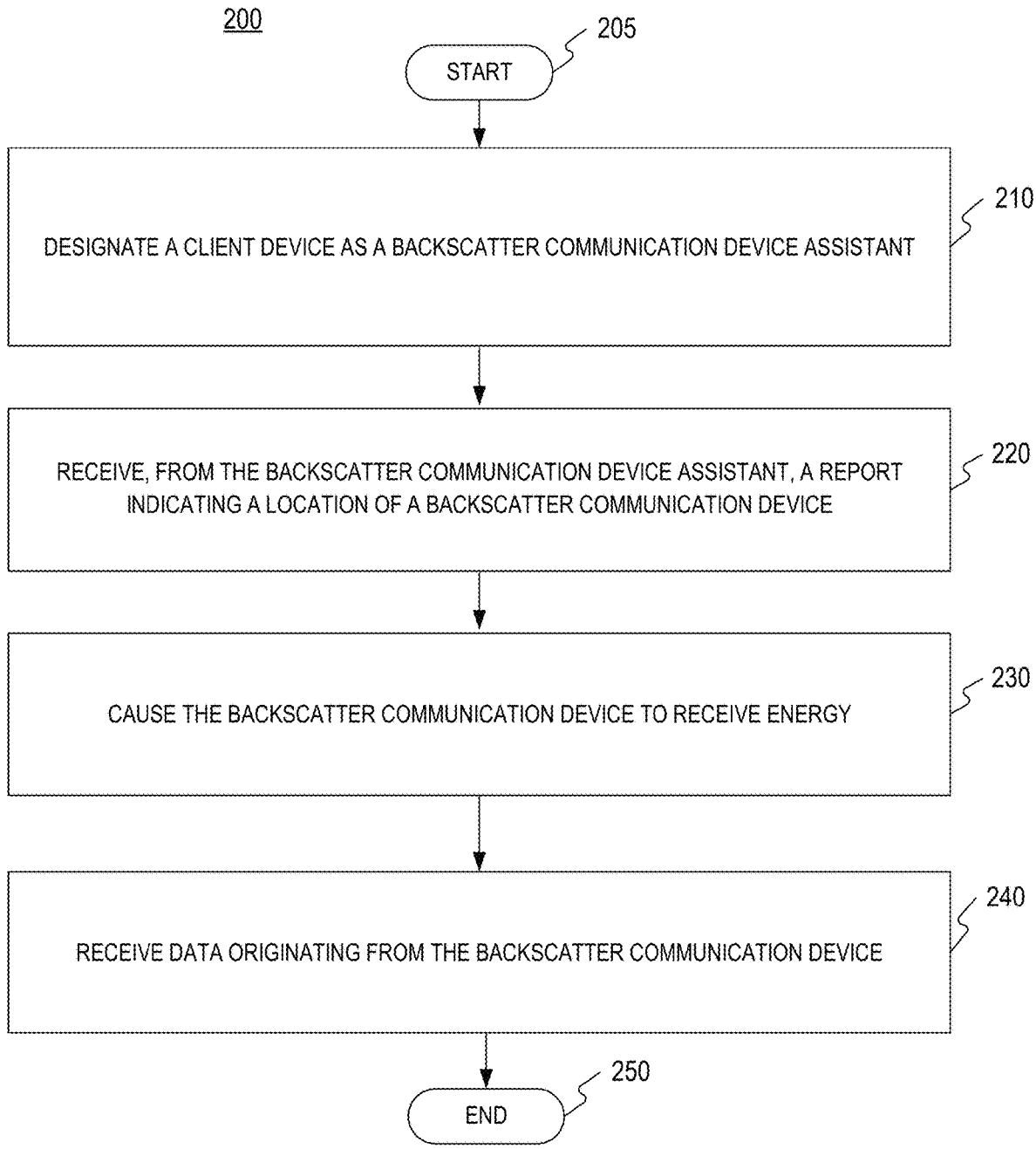
FIG. 2 is a flow chart of a method for providing a backscatter communication device assistant.

FIG. 2 is a flow chart setting forth the general stages involved in a method 200 consistent with embodiments of the disclosure for providing a backscatter communication device assistant. Method 200 may be implemented using a computing device 500 as described in more detail below with respect to FIG. 5. Computing device 500 may be embodied by controller 105 or any of the plurality of APs for example. Ways to implement the stages of method 200 will be described in greater detail below.

Method 200 may begin at starting block 205 and proceed to stage 210 where computing device 500 may designate a client device (e.g., first client device 155) as a backscatter communication device assistant. For example, a few trusted client devices in coverage environment 110 may be identified and controller 105 may partner with them. These client devices (e.g., backcom-buddies or backscatter communication device assistants) may be selected from second plurality of devices 135. When joining coverage environment 110, first client device 155 (e.g., a smart phone) and second client device 160 (e.g., a smart wireless light bulb) may share their capabilities (e.g., that they provide support to backscatter/ energy harvesting devices) with controller 105 at join time. Third client device 165 may not indicate that that it supports backscatter/energy harvesting devices. Accordingly, controller 105 may designate first client device 155 and second client device 160 as backscatter communication device assistants and may not designate third client device 165 as a backscatter communication device assistant.

From stage 210, where computing device 500 designates a client device as a backscatter communication device assistant, method 200 may advance to stage 220 where computing device 500 may receive, from the backscatter communication device assistant, a report indicating a location of a backscatter communication device (e.g., first device 140). For example, first client device 155 may provide its best-guess localization for the backscatter communication devices (e.g., first plurality of devices 130). First client device 155 may first discover backscatter communication devices and then report their locations. Discover and reporting do not have to be executed in the same location, therefore the backscatter communication device assistant may explore some area and then report later. The backscatter communication device assistant may continue its localization operations to report if backscatter communication devices have moved. Controller 105 may decide how it may support the backscatter communication devices in their needs.

Figure 3:
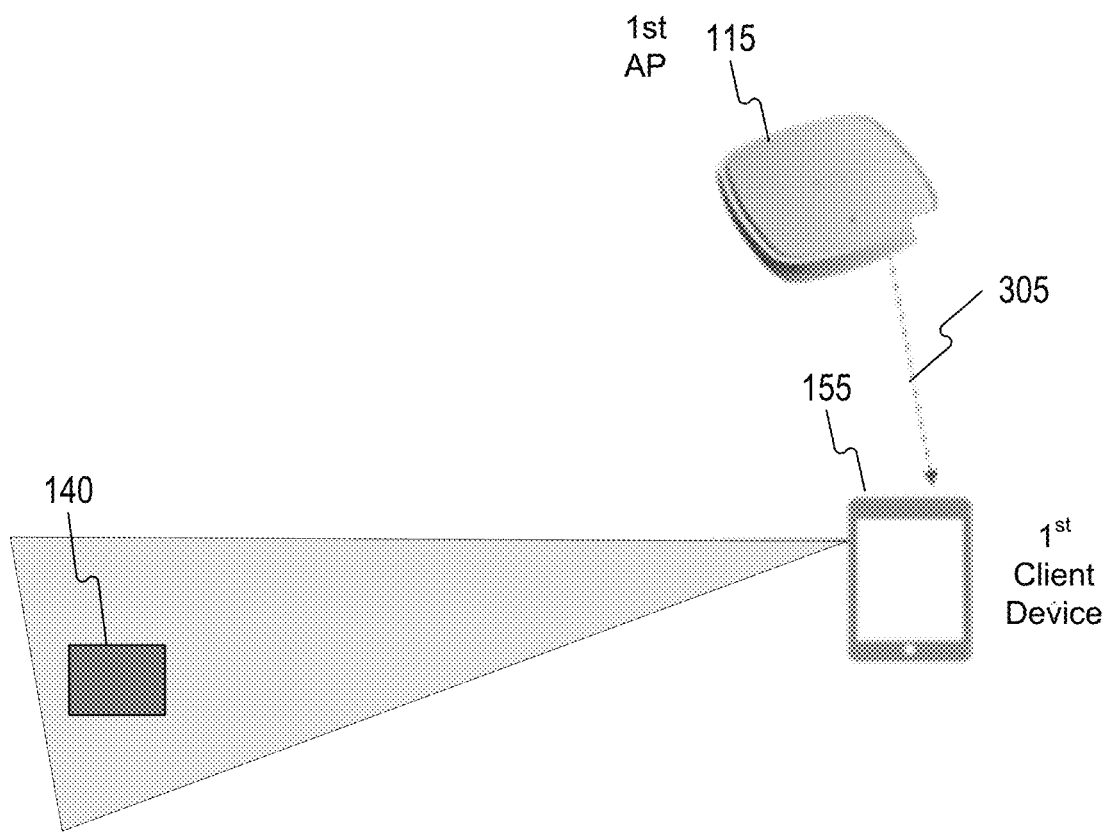
FIG. 3 illustrates a backscatter communication device assistant.

Once computing device 500 receives, from the backscatter communication device assistant, the report indicating the location of the backscatter communication device in stage 220, method 200 may continue to stage 230 where computing device 500 may cause the backscatter communication device to receive energy. For example, as illustrated by FIG. 3, controller 105 (e.g., via first AP 115) may instruct, via message 305, the backscatter communication device assistant (e.g., any of second plurality of client devices 135) to provide energy for a close-by backscatter communication device (e.g., first device 140). In this example, first device 140 may receive energy from first client device 155 when first client device 155 illuminates first device 140. First client device 155 may illuminate first device 140 with light energy or RF energy depending on first client device 155's ability to provide energy and first device 140's ability to receive energy.

Figure 4:
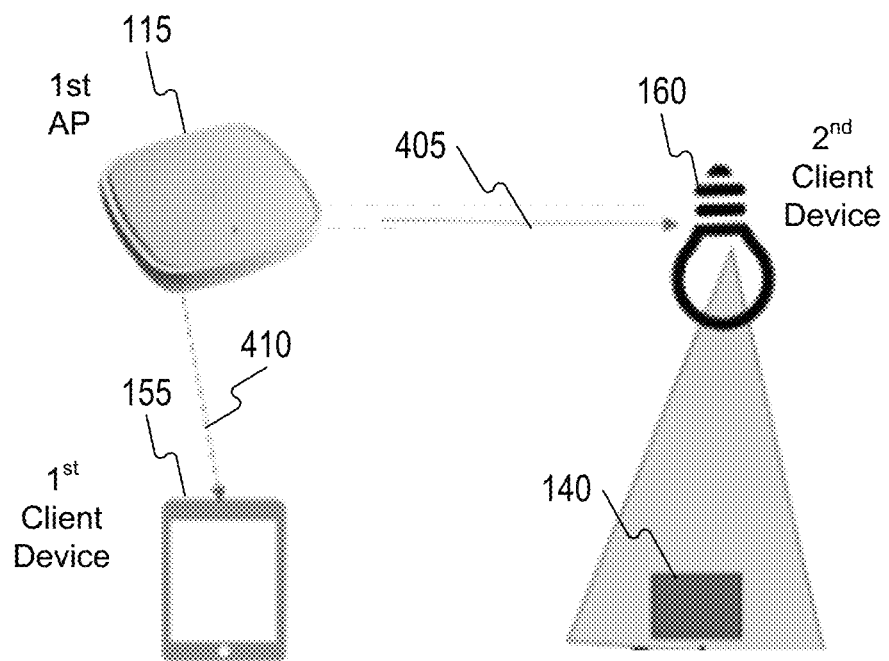
FIG. 4 illustrates a backscatter communication device assistant.

For example, as illustrated by FIG. 4, controller 105 (e.g., via first AP 115) may instruct, via message 405, the backscatter communication device assistant (e.g., second client device 160) to provide energy for a close-by backscatter communication device (e.g., first device 140). In this example, first device 140 may receive energy from second client device 160 when second client device 160 illuminates first device 140. In this example, second client device 160 may comprise a smart light bulb because first device 140 may be configured to receive light energy.

Backscatter communication device assistants and backscatter communication devices may move independently hence, their "binding" (i.e., what makes controller 105 choose a certain backscatter communication device assistant for a certain backscatter communication device) may change in time and may be re-evaluated. Such binding may also depend on the backscatter communication device assistant's capabilities and the backscatter communication device's needs. For example, if the backscatter communication device needs light as an energy source, then controller 105 may choose a smart light bulb as the backscatter communication device assistant.

After computing device 500 causes the backscatter communication device to receive energy in stage 230, method 200 may proceed to stage 240 where computing device 500 may receive data originating from the backscatter communication device. For example, as illustrated by FIG. 4, control 104 (e.g., via first AP 115) may send an instruction 410 that may instruct backscatter communication device assistants (e.g., first client device 155) to receive at a certain moment in time on a certain radio technology, where the backscatter communication device (e.g., first device 140) may transmit.

Instruction 410 may be precise or vague if a schedule is not computable (e.g., first device 140 may not provide a schedule) and then controller 105 may choose according to its best predictions. For example, by Wi-Fi-sensing or by hyperlocation on a user's smart phone (e.g., first client device 155), embodiments of the disclosure may determine that a person may be stepping toward a light switch that controls second client device 160. It may also determine that it is sunset time, therefore controller 105 may compute a high probability that the light switch may be operated causing first device 140 to receive energy and transmit a message. Controller 105 may instruct first client device 155 to receive this transmitted message. First client device 155 may provide this message to controller 105.

Backscatter communication device assistants may be exploited at different degrees according to their level of resources, capabilities, and power source. For example, a client device connected to a main power supply may be used without concerns of its power consumption, whereas a battery-operated client device may be operated to preserve its energy. Backscatter communication device assistants may also be used to authenticate backscatter communication device requests or payloads.

Furthermore, backscatter communication devices may be embedded in wearables (e.g., sensors embedded in fabric, in bracelets, etc.). In this example, the wearer may associate the wearer's smart phone as a backscatter communication device assistant for these wearables. This may be done in a pairing phase where the wearer's smart phone approaches the wearable, and scans energy to it through possible radios while lighting with the Light Emitting Diode (LED) on the smart phone as well. If the backscatter communication devices embedded in the wearable may exploit any of this energy, it may reply with an Identifier (ID) associated with the information of how to energize backscatter communication devices embedded in wearable, and for which it declares self as the backscatter communication device assistant. In a later phase, when the AP in the room scans for backscatter communication devices, the smart phone may answer on behalf of all backscatter communication devices embedded in wearable. Once computing device 500 receive the data originating from the backscatter communication device in stage 240, method 200 may then end at stage 250.

Figure 5:
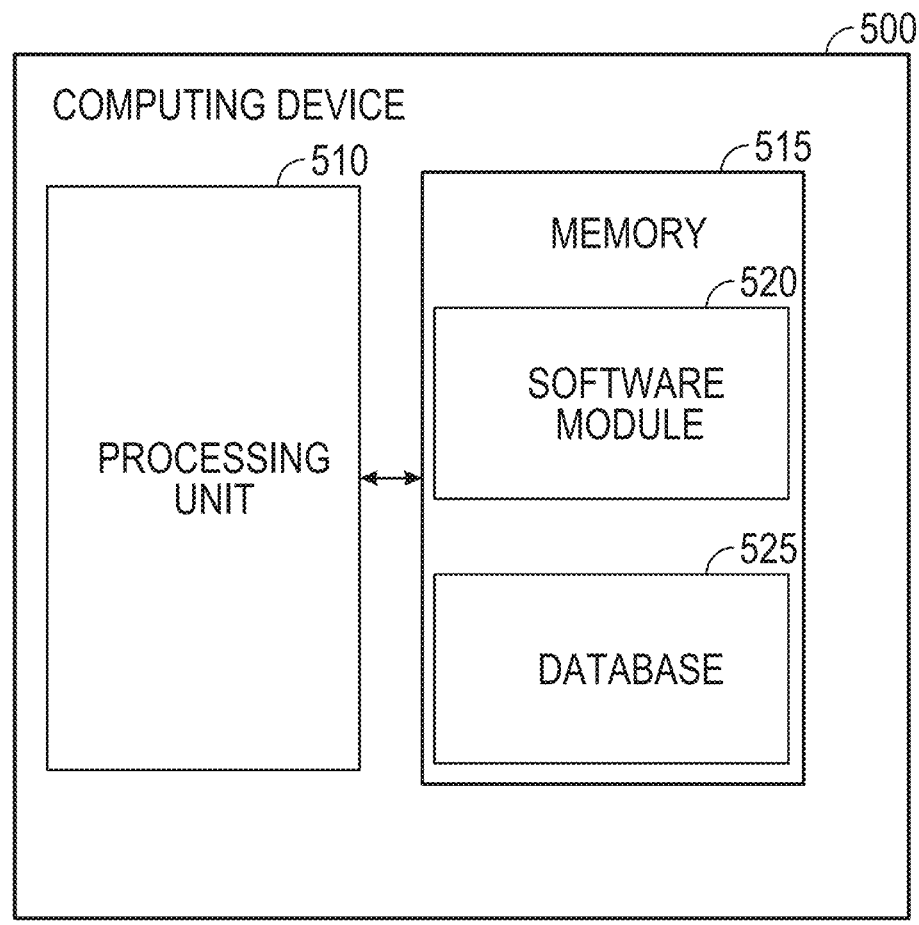
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing a backscatter communication device assistant as described above with respect to FIG. 2. Computing device 500, for example, may provide an operating environment for controller 105, first AP 115, second AP 120, third AP 125, first device 140, second device 145, third device 150, first client device 155, second client device 160, and third client device 165. Controller 105, first AP 115, second AP 120, third AP 125, first device 140, second device 145, third device 150, first client device 155, second client device 160, and third client device 165 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
designating, by a computing device, a client device as a backscatter communication device assistant;
receiving, from the backscatter communication device assistant, a report indicating a location of a backscatter communication device;
causing the backscatter communication device to receive energy, wherein the energy comprises light energy; and
receiving data originating from the backscatter communication device.

2. The method of claim 1, wherein designating the client device as the backscatter communication device assistant comprises designating the client device as the backscatter communication device assistant in response to the client device indicating that it is capable of serving as the backscatter communication device assistant.

3. The method of claim 1, wherein causing the backscatter communication device to receive the energy comprises causing a device to illuminate the backscatter communication device.

4. The method of claim 3, wherein causing the backscatter communication device to receive the energy comprises determining that the device is capable of supplying the energy.

5. The method of claim 3, wherein the device comprises the backscatter communication device assistant.

6. The method of claim 3, wherein the energy comprises Radio Frequency (RF) energy.

7. The method of claim 1, wherein receiving the data originating from the backscatter communication device comprises causing a device to receive the data originating from the backscatter communication device.

8. The method of claim 7, wherein receiving the data originating from the backscatter communication device comprises receiving the data originating from the backscatter communication device from the device.

9. The method of claim 7, wherein the device comprises the backscatter communication device assistant.

10. The method of claim 7, wherein the device comprises another backscatter communication device assistant.

11. A system comprising:
a memory storage; and a processing unit coupled to the memory storage, wherein the processing unit is operative to:
  designate a client device as a backscatter communication device assistant;
  receive, from the backscatter communication device assistant, a report indicating a location of a backscatter communication device; and
  cause the backscatter communication device to receive energy, wherein the energy comprises light energy.

12. The system of claim 11, wherein the processing unit is further operative to receive data originating from the backscatter communication device.

13. The system of claim 11, wherein the processing unit being operative to cause the backscatter communication device to receive the energy comprises the processing unit being operative to cause a device to illuminate the backscatter communication device.

14. The system of claim 13, wherein the processing unit being operative to cause the backscatter communication device to receive the energy comprises the processing unit being operative to determine that the device is capable of supplying the energy.

15. The system of claim 13, wherein the device comprises the backscatter communication device assistant.

16. The system of claim 13, wherein the energy comprises Radio Frequency (RF) energy.

17. A non-transitory computer-readable medium that stores a set of instructions which when executed perform a method executed by the set of instructions comprising:
  designating, by a computing device, a client device as a backscatter communication device assistant;
  receiving, from the backscatter communication device assistant, a report indicating a location of a backscatter communication device;
  causing the backscatter communication device to receive energy, wherein the energy comprises light energy; and
  receiving data originating from the backscatter communication device.

18. The non-transitory computer-readable medium of claim 17, wherein designating the client device as the backscatter communication device assistant comprises designating the client device as the backscatter communication device assistant in response to the client device indicating that it is capable of serving as the backscatter communication device assistant.

* * * * *